US007890258B2

(12) United States Patent
Endo et al.

(10) Patent No.: US 7,890,258 B2
(45) Date of Patent: Feb. 15, 2011

(54) ROUTE SEARCH METHOD FOR NAVIGATION DEVICE

(75) Inventors: Yoshinori Endo, Kanagawa (JP); Shinichi Amaya, Kanagawa (JP)

(73) Assignee: Xanavi Informatics Corporation, Kanagawa (JP)

( * ) Notice: Subject to any disclaimer, the term of this patent is extended or adjusted under 35 U.S.C. 154(b) by 1214 days.

(21) Appl. No.: 10/586,356

(22) PCT Filed: Dec. 24, 2004

(86) PCT No.: PCT/JP2004/019309

§ 371 (c)(1), (2), (4) Date: Jul. 17, 2006

(87) PCT Pub. No.: WO2005/068940

PCT Pub. Date: Jul. 28, 2005

(65) Prior Publication Data

US 2007/0162222 A1 Jul. 12, 2007

(30) Foreign Application Priority Data

Jan. 16, 2004 (JP) ............................. 2004-009038

(51) Int. Cl.
*G01C 21/30* (2006.01)
*G01C 21/32* (2006.01)
*G01C 21/00* (2006.01)

(52) U.S. Cl. .................. 701/209; 701/200; 701/201; 701/202; 701/204; 701/206

(58) Field of Classification Search ............... None
See application file for complete search history.

(56) References Cited

U.S. PATENT DOCUMENTS

| 5,475,387 | A  | * | 12/1995 | Matsumoto | 340/990 |
| 6,240,364 | B1 | * | 5/2001  | Kerner et al. | 701/210 |
| 6,256,579 | B1 | * | 7/2001  | Tanimoto | 701/201 |
| 6,285,950 | B1 | * | 9/2001  | Tanimoto | 701/201 |
| 6,438,490 | B2 | * | 8/2002  | Ohta | 701/210 |
| 6,456,932 | B2 | * | 9/2002  | Yagyu | 701/209 |
| 6,480,783 | B1 | * | 11/2002 | Myr | 701/117 |
| 6,615,130 | B2 | * | 9/2003  | Myr | 701/117 |
| 6,732,048 | B2 | * | 5/2004  | Blewitt | 701/210 |
| 6,826,472 | B1 | * | 11/2004 | Kamei et al. | 701/202 |

(Continued)

FOREIGN PATENT DOCUMENTS

JP     09-081894     3/1997

(Continued)

OTHER PUBLICATIONS

Japanese Patent Office Standard Technique Collection, "User Interface of Car Navigation Device 3-B-3".

*Primary Examiner*—Khoi Tran
*Assistant Examiner*—Nicholas Kiswanto
(74) *Attorney, Agent, or Firm*—Antonelli, Terry, Stout & Kraus, LLP.

(57) ABSTRACT

A navigation device that calculates an expected travel time or an expected arrival time for each retrieved route, using link costs predetermined for calculation of expected travel times regardless of search conditions. As the link costs for the calculation of expected travel times, are used link travel times obtained by statistically processing traffic information collected in the past, for example.

20 Claims, 12 Drawing Sheets

U.S. PATENT DOCUMENTS

| | | | |
|---|---|---|---|
| 6,839,630 B2 * | 1/2005 | Sakamoto | 701/211 |
| 2001/0029425 A1 * | 10/2001 | Myr | 701/200 |
| 2001/0047242 A1 * | 11/2001 | Ohta | 701/210 |
| 2002/0065604 A1 * | 5/2002 | Sekiyama | 701/209 |
| 2003/0069683 A1 * | 4/2003 | Lapidot et al. | 701/117 |
| 2004/0220728 A1 * | 11/2004 | Cayford | 701/209 |
| 2005/0043880 A1 * | 2/2005 | Yamane et al. | 701/200 |
| 2005/0267651 A1 * | 12/2005 | Arango et al. | 701/3 |
| 2009/0326793 A1 * | 12/2009 | Powell et al. | 701/200 |

FOREIGN PATENT DOCUMENTS

| | | |
|---|---|---|
| JP | 10-141975 | 5/1998 |
| JP | 10-300495 | 11/1998 |
| JP | 2001-241960 | 9/2001 |
| JP | 2003-177024 | 6/2003 |
| JP | 2003-214868 | 7/2003 |
| JP | 2004-301677 | 10/2004 |

* cited by examiner

| DATE (331) | COLLECTION CONDITION A (DAY TYPE) (332) |
|---|---|
| 2002/11/28 | ORDINARY DAY (GENERAL) |
| 2002/11/29 | ORDINARY DAY (BEFORE HOLIDAY) |
| 2002/11/30 | HOLIDAY (GENERAL) |
| 2002/12/01 | HOLIDAY (GENERAL) |
| 2002/12/02 | ORDINARY DAY (AFTER HOLIDAY) |
| 2002/12/03 | ORDINARY DAY (GENERAL) |
| ⋮ | ⋮ |

ROUTE SEARCH METHOD FOR NAVIGATION DEVICE

BACKGROUND OF THE INVENTION

The present invention relates to a navigation device, and particularly to a technique of searching for routes that should be recommended by a car-mounted navigation device.

Non-patent Document 1 (Japanese Patent Office Standard Technique Collection, "User Interface of Car Navigation Device 3-B-3") describes a navigation device that sets a plurality of searching conditions, and obtains a route whose cost of traveling from the departure point to the destination is smallest for each search condition. Generally, such a navigation device displays an expected travel time or an expected arrival time for aiding a user to select a route to be used for his guidance among a plurality of routes.

SUMMARY OF THE INVENTION

However, depending on search conditions, travel times obtained from different information sources (different kinds of information) may be used for route searching. In the technique of Non-patent Document 1, costs (travel times) used for route searching are used as they are for obtaining expected travel times or expected arrival times. Under such conditions, the routes that have been retrieved using different information sources (different kinds of information) can not be compared with one another on the basis of their expected travel times (expected arrival times).

For example, with respect to one route, an expected travel time obtained by using link travel times included in map data may be largely different from an expected travel time obtained by statistical processing of traffic information collected in the past.

The present invention has been made considering the above situation, and an object of the present invention is to provide a technique of outputting expected travel times (expected arrival times) of routes retrieved under various search conditions such that those expected travel times (expected arrival times) can be compared appropriately with one another.

To solve the above problem, in a route search method of a navigation device of the present invention, predetermined link costs are used for calculating an expected travel time or an expected arrival time of a retrieved route disregarding a search condition employed for searching for that route. As link costs used for calculation of an expected travel time, are used link travel times obtained by statistically processing traffic information collected in the past, for example.

The present invention is defined as follows, for example.

A route search method for a navigation device, wherein: said navigation device comprises a storage unit that stores link data for each link as a component of roads on a map and statistical data including link travel times obtained by statistically processing traffic information collected previously. The navigation device performs a step of establishing a plurality of route search conditions; a route search step, in which, for each of said plurality of route search conditions, a cost of each link is determined using said link data or said statistical data depending on the route search condition in question, and a route having a smallest total cost for traveling from a departure point to a destination is searched for; and a travel time calculation step, in which an expected travel time for each of a plurality of routes retrieved in said route search step is calculated using said statistical data.

Further, the above-mentioned route search step may be a step in which a cost of each link is determined using link length information included in said link data when a search condition is established in order to perform a search giving priority to a travel distance, and a cost of each link is determined using a link travel time included in said statistical data when a search condition is established in order to perform a search that gives priority to a travel time and uses the statistical data, and a cost of each link is determined using a link travel time obtained from map information included in said link data when a search condition is established in order to perform a search that gives priority to a travel time and does not use the statistical data, and then a route having a smallest total cost for traveling from a departure point to a destination is searched for.

Further, the navigation device may perform route guidance using a route retrieved in the above-mentioned route search step.

According to the present invention, it is possible to provide a technique of outputting a plurality of route search results in a form that those results can be easily compared.

DETAILED DESCRIPTION

Figure 1:
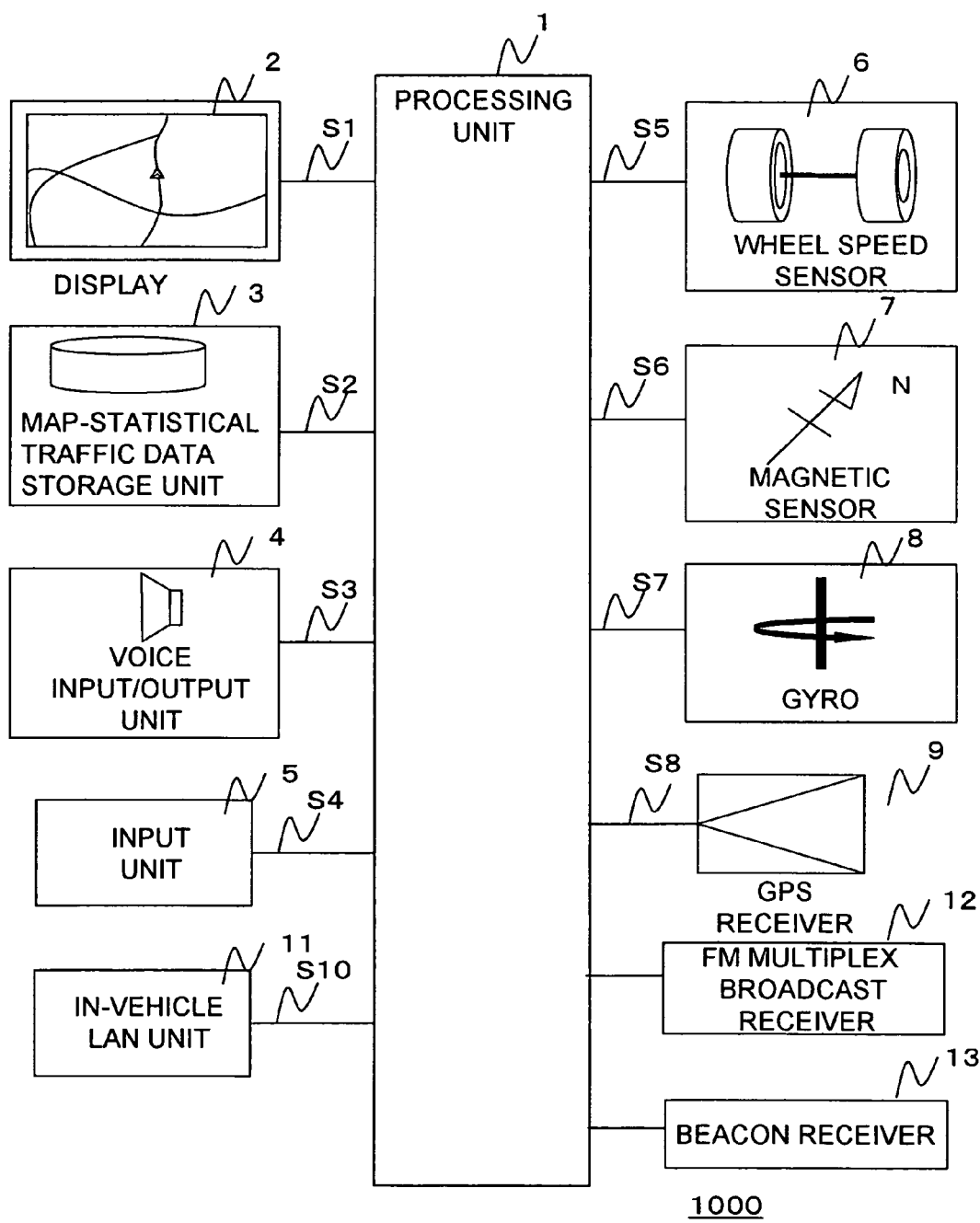
FIG. 1 is a schematic block diagram showing a car-mounted navigation device 1000.

Now, one embodiment of the present invention will be described referring to the drawings.

FIG. 1 is a schematic block diagram showing a car-mounted navigation device 1000 according to one embodiment of the present invention. As shown in the figure, the car-mounted navigation device 1000 of the present embodiment comprises: a processing unit 1; a display 2; a map-statistical traffic data storage unit 3; a voice input/output unit 4; an input unit 5; a wheel speed sensor 6; a magnetic sensor 7; a gyro sensor 8; a GPS (Global Positioning System) receiver 9; an in-vehicle LAN unit 11; an FM multiplex broadcast receiver 12; and a beacon receiver 13.

The processing unit 1 is a central unit that performs various kinds of processing. For example, the processing unit 1 detects the present location based on pieces of information outputted from various sensors 6-8 and the GPS receiver 9, and reads map data required for display from the map-statistical traffic data storage unit 3 based on the obtained present location information. Further, the processing unit 1 expands the read map data into a graphic, superimposes a mark indicating the present location upon the graphic, and displays the graphic on the display 2. Further, using map data and statistical traffic data stored in the map-statistical traffic data storage unit 3, the processing unit 1 searches for the best route (recommended route) connecting the destination designated by a user and the present location (the departure point) and guides the user through the voice input/output unit 4 and the display 2.

The display 2 is a unit that displays graphics information generated by the processing unit 1, and comprises a CRT or a liquid crystal display. Generally, a signal S11 that connects the processing unit 1 and the display 2 is an RGB signal or an NTSC (National Television System Committee) signal.

The map-statistical traffic data storage unit 3 comprises a storage medium such as a CD-ROM, a DVD-ROM, an HDD or an IC card. This storage medium stores the map data and the statistical traffic data.

Figure 2:
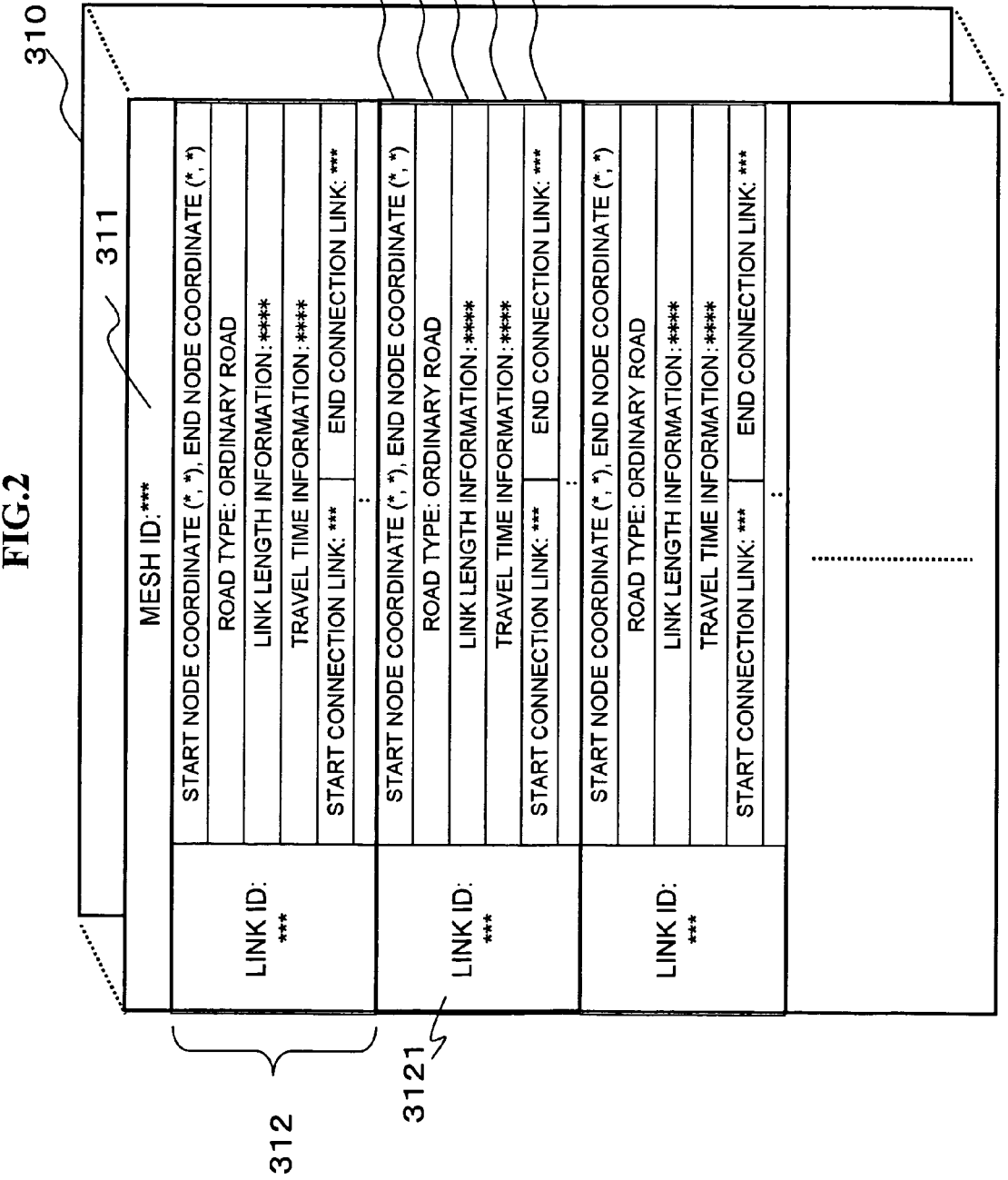
FIG. 2 is a diagram showing an example of a configuration of map data stored in a map-statistical traffic data storage unit 3.

FIG. 2 is a diagram showing an example of a configuration of the map data stored in the map-statistical traffic data storage unit 3. As shown in the figure, a piece of map data 310 is stored for each mesh area. Each piece of map data 310 includes an identification code (a mesh ID) 311 of the mesh area concerned and respective pieces of link data 312 of component links of roads included in the mesh area. Each piece of link data 312 includes: an identification code (a link ID) 3121 of the link concerned; coordinate information 3122 of two nodes (a start node and an end node) constituting the link; type information 3123 of a road that includes the link; link length information 3124 that indicates the length of the link; link travel time information 3125; link IDs (connecting link IDs) 3126 that are respectively connected to the two nodes; and the like. Here, two nodes constituting a link are differentiated as the start node and the end node so that the up direction and the down direction of the same road are managed as different links from each other. Further, each piece of map data 310 includes information (names, types, coordinate information) of map elements other than roads included in the corresponding mesh area. The link travel time 3125 is obtained from map information such as the link length, the speed limit and the like, and different from the below-mentioned travel time obtained by statistically processing past traffic information. Further, the link travel time information 3125 can be omitted from the data. In that case, a travel time of a link may be generated from the road type 3123, the link length information 3124 and the like of the link.

Figure 3:
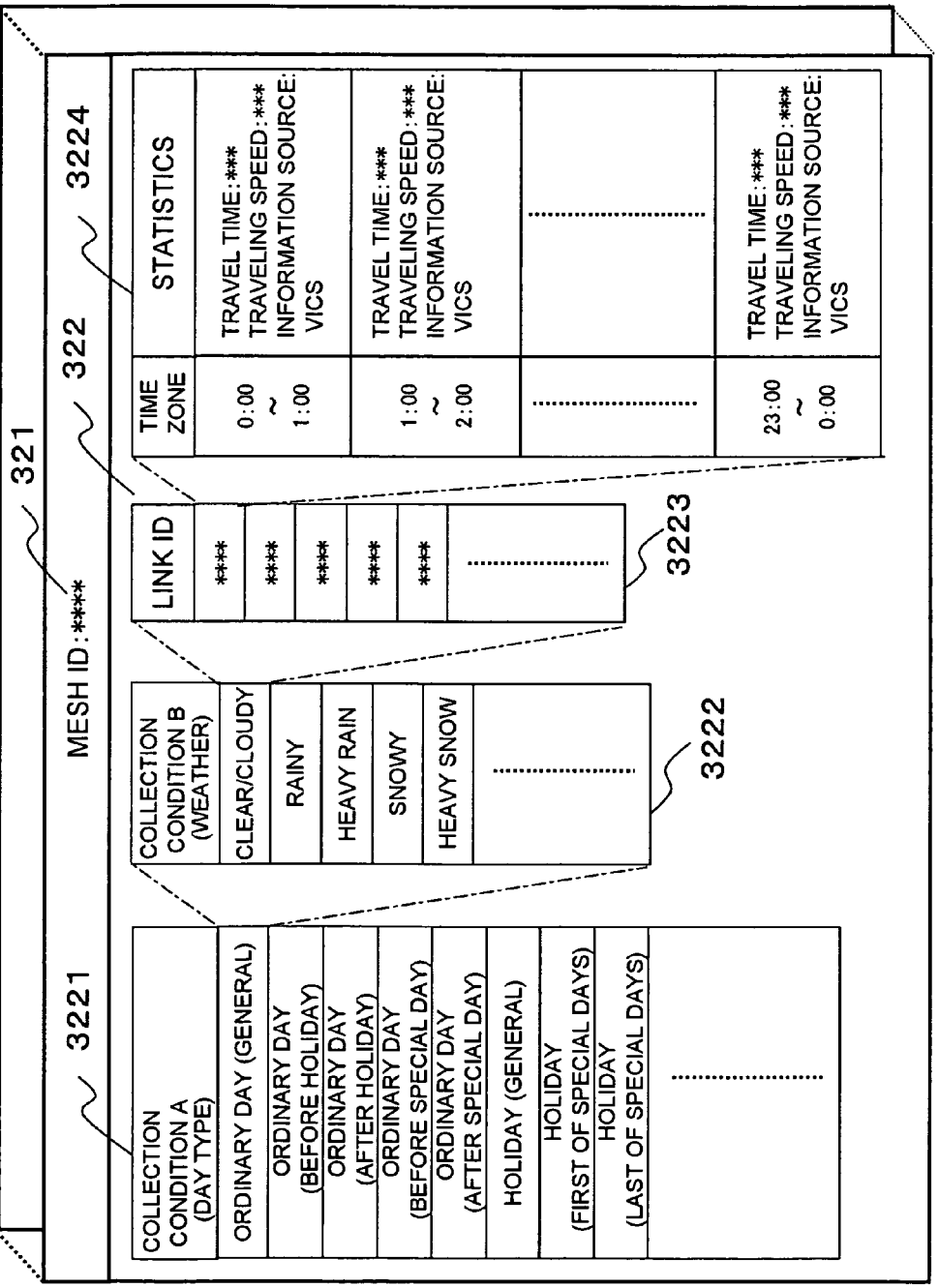
FIG. 3 is a diagram showing an example of a configuration of statistical traffic data stored in the map-statistical traffic data storage unit 3.

FIG. 3 is a diagram showing an example of a configuration of the statistical traffic data stored in the map-statistical traffic data storage unit 3. As shown in the figure, a piece of statistical traffic data 320 is stored for each mesh area. Each piece of statistical traffic data 320 includes a mesh ID 321 of the mesh area concerned and traffic information statistical data (traffic information statistics collected in the past) 322 of links constituting the roads included in the mesh area. The same mesh IDs 321 as the mesh IDs 311 of the map data 310 are used. The traffic information statistical data 322 includes traffic information statistics 3224 corresponding to a combination of collection conditions 3221 and 3222 and a link ID 3223.

A day type as one of the collection conditions is registered in a day type list 3221. Favorably, each day type may be defined as a class that shows a different tendency of traffic information statistics from the other classes. Here, day types include: an ordinary day just before a holiday, "Ordinary Day (Before Holiday)"; an ordinary day just after a holiday, "Ordinary Day (After Holiday)"; an ordinary day just before a special day such as the Festival of the Dead or New Year's Day, "Ordinary Day (Before Special Day)"; an ordinary day just after a special day, "Ordinary Day (After Special Day)"; other ordinary day, "Ordinary Day (General)"; the first day of special days, "Holiday (First of Special Days)"; the last day of special days, "Holiday (Last of Special Days)"; and other holiday, "Holiday (General)".

A weather type as the other collection condition is registered in a weather list 3222. A weather list 3222 is provided for each day type registered in the day type list 3221. Each weather type may be defined as a class whose traffic information statistics show a different tendency from the other classes. Here, weather types include: "Clear/Cloudy"; "Rainy"; "Heavy Rain"; "Snowy"; and "Heavy Snow".

A link ID of each link is registered in a link ID list 3223. A link ID list 3223 is provided for each weather type registered in the weather list 3222. The same link IDs as the link IDs 3121 of the map data 310 are used.

A table 3224 is used for registering traffic information statistics for each time zone and is provided for each link ID registered in a link ID list 3223. Traffic information statistics for each time zone include a link travel time (and/or a traveling speed (a moving speed)) specified by pieces of traffic information that are the sources of these statistics. Further, traffic information statistics for each time zone are classified by the collection conditions of the pieces of traffic information that are the sources of these statistics (i.e. the day type and the weather type of the days when the pieces of traffic information as the sources have been collected) and the object link. In other words, the object link of traffic information statistics registered in a table 3224 for each time zone is the link specified by a link ID in the link ID list 3223 associated with that table 3224. And, the pieces of traffic information as the sources of these statistics are traffic information collected in the weather specified by the weather type in the table 3222 with which the link ID list 3223 registering that link ID is associated and on the days specified by the day type in the day type list 3221 with which the weather list 3222 registering that weather type is associated.

The map-statistical traffic data storage unit 3 stores a date translation table that is used for specifying a day type registered in the day type list 3221 from a date.

Figure 4:
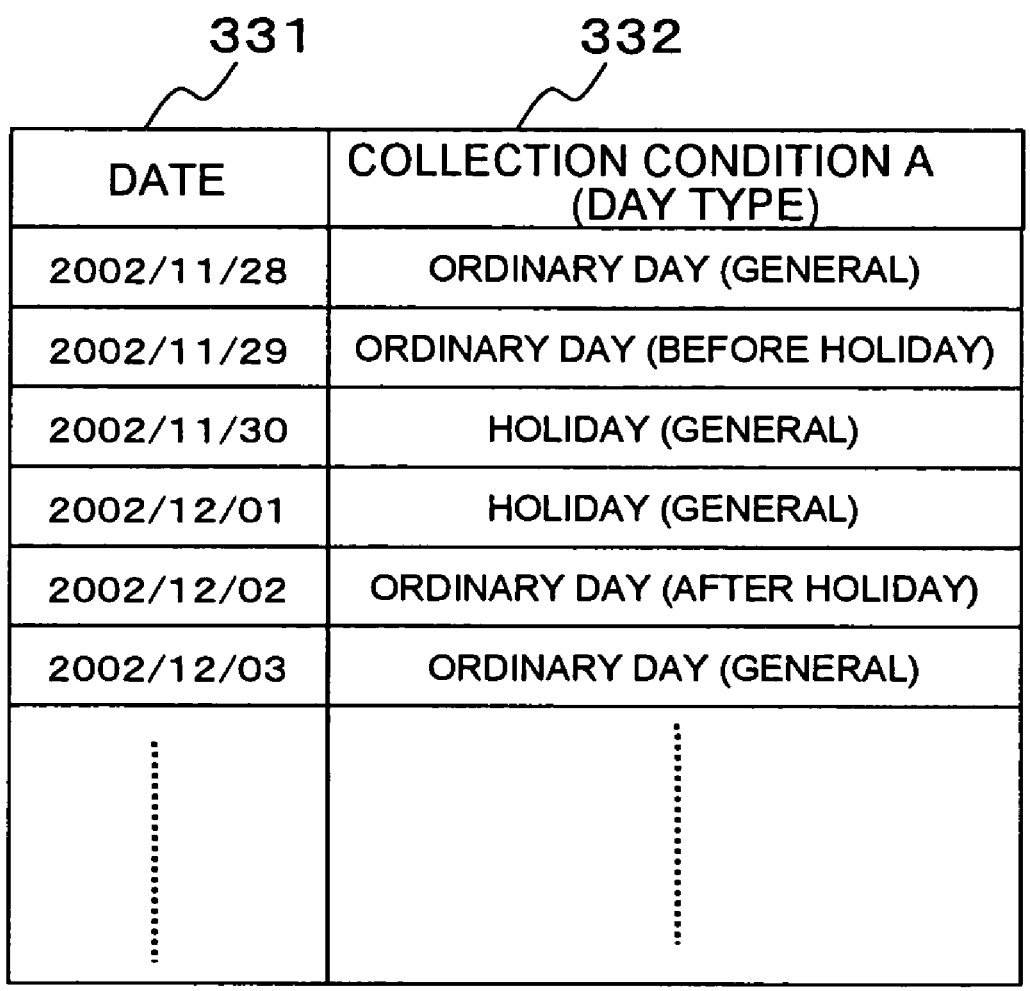
FIG. 4 is a diagram showing an example of a configuration of a date translation table used for specifying the day type based on the date.

FIG. 4 is a diagram showing an example of a configuration of the date translation table. As shown in the figure, a date 331 and a day type 332 corresponding to that date 331 are associated and registered. Using such a date translation table, it is possible to specify a day type from a date.

Returning to FIG. 1, the description will be continued. The voice input/output unit 4 converts a message to the user (which has been generated by the processing unit 1) into a voice signal and outputs the voice signal. In addition, the voice input/output unit 4 recognizes voice of the user and transfers the contents of the voice to the processing unit 1.

The input unit 5 receives an instruction from the user and comprises hard switches such as scroll keys and a scale key, a joystick, a touch panel stuck on a display panel, and the like.

The sensors 6-8 and the GPS receiver 9 are used in the car-mounted navigation device for detecting the present location (i.e. the location of the vehicle that is equipped with the navigation device in question). The wheel speed sensor 6 measures the number of revolutions of a wheel to obtain a distance based on the product of the circumference of the wheel and the measured number of revolutions of the wheel, and further measures an angle of a turn of the moving body based on a difference between the numbers of revolutions of a pair of wheels. The magnetic sensor 7 detects the magnetic field of the earth to detect the direction in which the moving body faces. The gyro 8 comprises fiber optic gyros, vibrating structure gyros and the like, and detects an angle of rotation of the moving body. The GPS receiver 9 receives signals from GPS satellites, and measures distances and rates of change of distance between the moving body and three or more GPS satellites to detect the present location, the moving speed and the traveling direction of the moving body.

The in-vehicle LAN unit 11 receives various pieces of information (such as information on opening and closing of doors, information regarding on or off states of lights, a state of the engine, results of failure diagnosis and the like) about the vehicle on which the car-mounted navigation device of the present embodiment is mounted.

The FM multiplex broadcast receiver 12 receives summarized present traffic data, traffic restriction information and weather information sent as FM multiplex broadcast signals sent from FM multiplex broadcasting stations.

The beacon receiver 13 receives present traffic data including link travel times sent from beacons.

Figure 5:
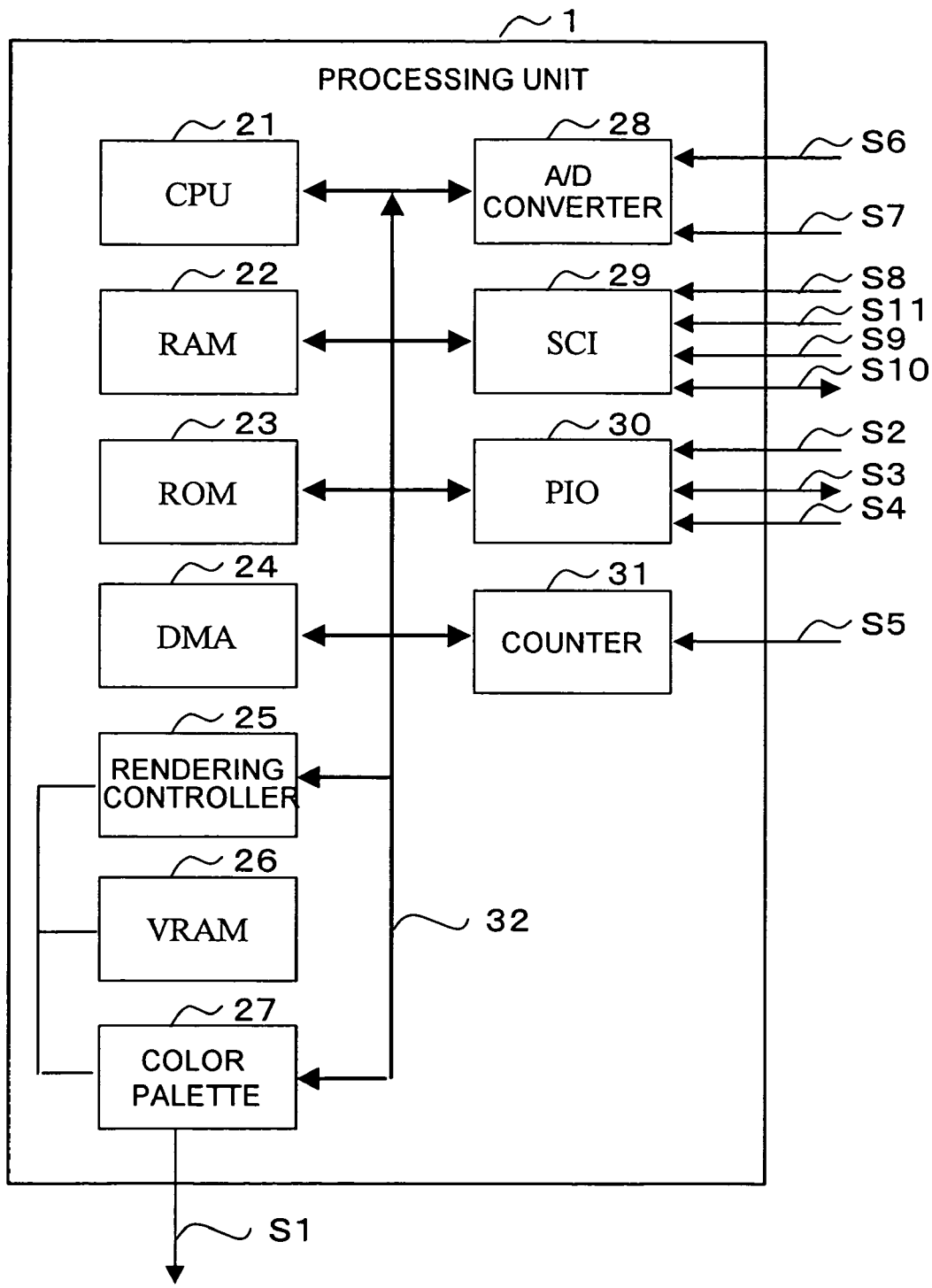
FIG. 5 is a diagram showing a hardware configuration of a processing unit 1.

FIG. 5 is a diagram showing an example of a hardware configuration of the processing unit 1.

As shown in the figure, the processing unit 1 is constructed by connecting devices by a bus 32. The processing unit 1 comprises: a CPU (Central Processing Unit) 21 for executing various processes such as numerical operation and control of various devices; a RAM (Random Access Memory) 22 for storing map data, statistical traffic data, operation data and the like read from the map-statistical traffic data storage unit 3; a ROM (Read Only Memory) 23 for storing programs and data; a DMA (Direct Memory Access) 24 for executing data transfer between the memories and between a memory and a device; a rendering controller 25 for executing graphics rendering and display control; a VRAM (Vide Random Access Memory) 26 for buffering graphics image data; a color palette 27 for converting image data into an RGB signal; an A/D converter 28 for converting an analog signal into a digital signal; an SCI (Serial Communication Interface) 29 for converting a serial signal into a parallel signal synchronized with the bus; a PIO (Parallel Input/Output) 30 for putting a parallel signal on the bus synchronously with the bus; and a counter 31 for integrating a pulse signal.

Figure 6:
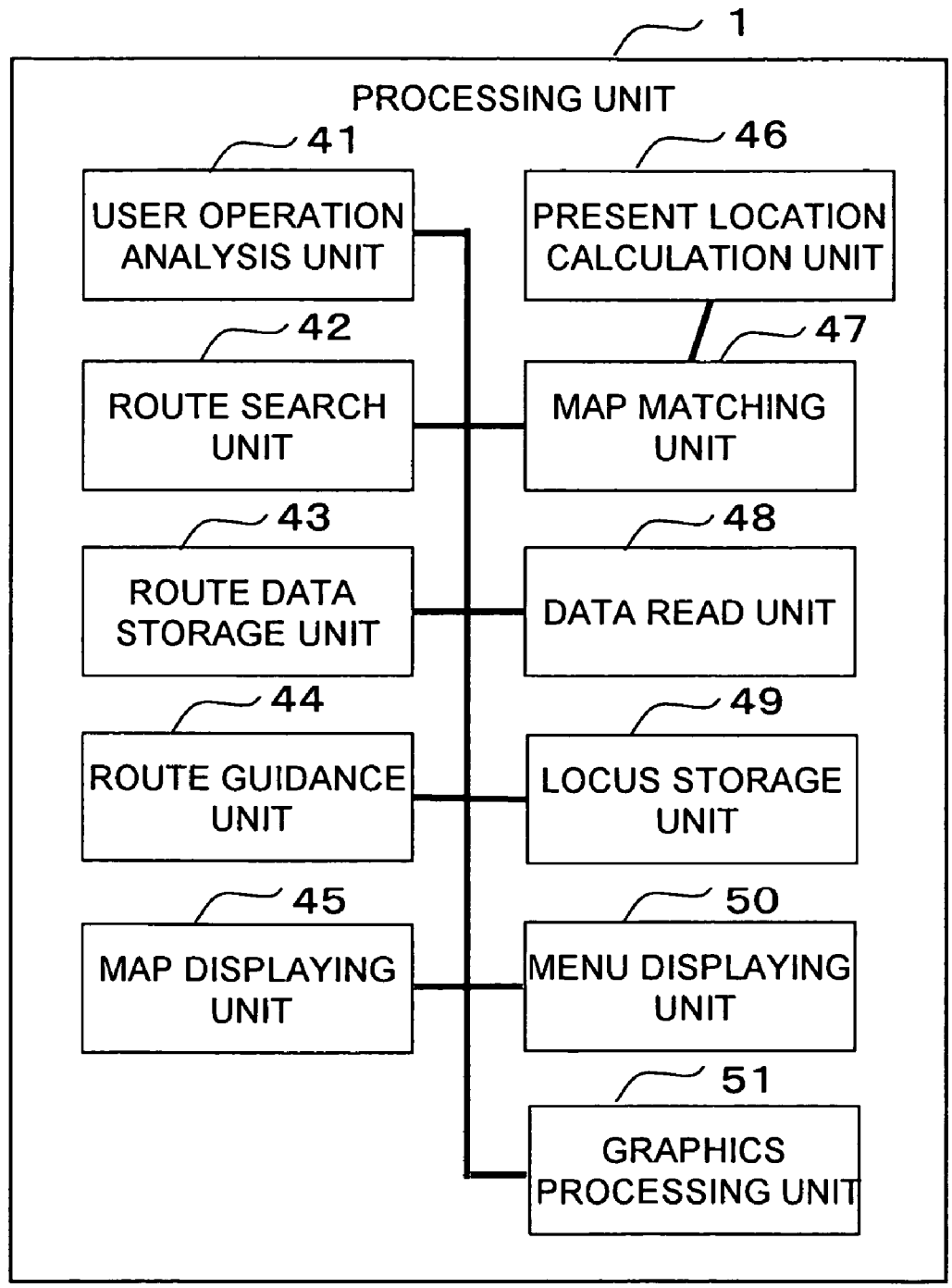
FIG. 6 is a diagram showing a functional configuration of the processing unit 1.

FIG. 6 is a diagram showing a functional configuration of the processing unit 1.

As shown in the figure, the processing unit 1 comprises: a user operation analysis unit 41; a route search unit 42; a route data storage unit 43; a route guidance unit 44; a map displaying unit 45; a present location calculation unit 46; a map matching unit 47; a data read unit 48; a locus storage unit 49; a menu displaying unit 50; and a graphics processing unit 51.

The present location calculation unit 46 periodically calculates the present location (X', Y') i.e. the location of the vehicle based on the initial location (X, Y) by integrating distance data and angle data progressively along the time axis. The distance data and the angle data are in turn obtained by integrating distance pulse data S5 obtained from the wheel speed sensor 6 and angular acceleration data S7 obtained from the gyro 8, respectively. The present location calculation unit 46 outputs the calculated present location to the map matching unit 47. Here, to conform the angle of rotation of the vehicle with the direction in which the vehicle moves, an absolute direction in which the vehicle moves is estimated by referring to direction data S6 obtained from the magnetic sensor 7 and the angle data obtained by integrating the angular acceleration data S7 obtained from the gyro 8. Progressive integration of the data of the wheel speed sensor 6 and the data of the gyro 8 brings accumulation of errors. Accordingly, the accumulated errors are cancelled at certain time intervals based on location data obtained from the GPS receiver 9, before outputting the information of the present location to the map matching unit 47.

The map matching unit 47 performs map matching. Namely, the map matching unit 47 compares map data of the present location's surrounding area, which are read through the data read unit 48, with a travel locus stored in the below-described locus storage unit 49, and incorporates the present location into the road (link) whose shape has the highest correlation with the travel locus. The present location is periodically outputted from the present location calculation unit 46. The information of the present location obtained by the present location calculation unit 46 includes sensor errors. Accordingly, the map matching is performed to improve the location accuracy. As a result, in many cases, the present location is consistent with the road on which the vehicle travels.

At each time when the vehicle runs a predetermined distance, the locus storage unit 49 stores locus data, i.e. the information on the present location subjected to the map matching by the map matching unit 47. The locus data are used for depicting locus marks along the map roads corresponding to the roads that the vehicle has really run hitherto.

The user operation analysis unit 41 receives a request inputted by the user through the input unit 5, analyzes the content of the request, and controls various units of the processing unit 1 to perform processing corresponding to the content of the request. For example, when the user requests a search for a recommended route, the user operation analysis unit 41 requests the map displaying unit 45 to display a map on the display 2 for setting a destination, and requests the route search unit 42 to calculates a route from the present location (the departure point) to the destination.

The route search unit 42 employs, for example, Dijkstra's algorithm for searching for a route connecting the designated two points (i.e. the present location and the destination) so that the cost of the route becomes smallest. Then, the route search unit 42 stores the thus-obtained recommended route in the route data storage unit 43. In the present embodiment, the route search unit 42 employs the travel time 3125 or the link length in link data 312 as a link cost to perform the route searching. Or, the route search unit 42 employs the travel time in traffic information statistics as a link cost. Further, with respect to the obtained route, the route search unit 42 obtains an expected travel time and an expected arrival time by means of the link travel times in the traffic information statistics 3224.

From the operator, the route guidance unit 44 receives selection of a route to be used for route guidance among a plurality of routes stored in the route data storage unit 43. Then, the route guidance unit 44 performs route guidance using the received route. For example, the route guidance unit 44 compares the information on the route with the information on the present location outputted from the map matching unit 47, and advise the user to go straight, to turn right, or to turn left before passing an intersection, using the voice input/output unit 4. Further, the route guidance unit 44 displays the traveling direction on the map displayed on the display 2 so that the recommended route is known to the user.

Further, the route guidance unit 44 calculates an expected travel time from the present location outputted from the map matching unit 47 to the destination, using the statistical traffic data stored in the map-statistical traffic data storage unit 3.

Then, the route guidance unit 44 adds the calculated expected travel time to the present time to obtain an expected time of arrival at the destination, and notifies the user of the expected arrival time.

The data read unit 48 reads and prepares map data and statistical traffic data corresponding to areas whose display on the display 2 is requested or areas required for route searching (i.e. areas including the departure point and the destination) from the map-statistical traffic data storage unit 3.

The map displaying unit 45 receives map data corresponding to areas whose display on the display 2 is requested, from the map-statistical traffic data storage unit 3, and generates map rendering commands in order that the graphics processing unit 51 can render roads, other map elements, marks such as the present location, the destination and arrows for the guided route. Further, receiving an instruction outputted from the user operation analysis unit 41, the map displaying unit 45 receives statistical traffic data whose display on the display 2 is requested, from the map-statistical traffic data storage unit 3, and generates map rendering commands in order that traffic information of each road can be displayed being superimposed on the map displayed now on the display 2.

The menu displaying unit 50 receives an instruction outputted from the user operation analysis unit 41 and generates menu rendering commands in order that the graphics processing unit 51 can render various kinds of menus and graphs.

The graphics processing unit 51 receives commands generated by the map displaying unit 45 and the menu displaying unit 50, and performs image development on the VRAM 26 with respect to image data to be displayed on the display 2.

[Description of Operation]

Figure 7:
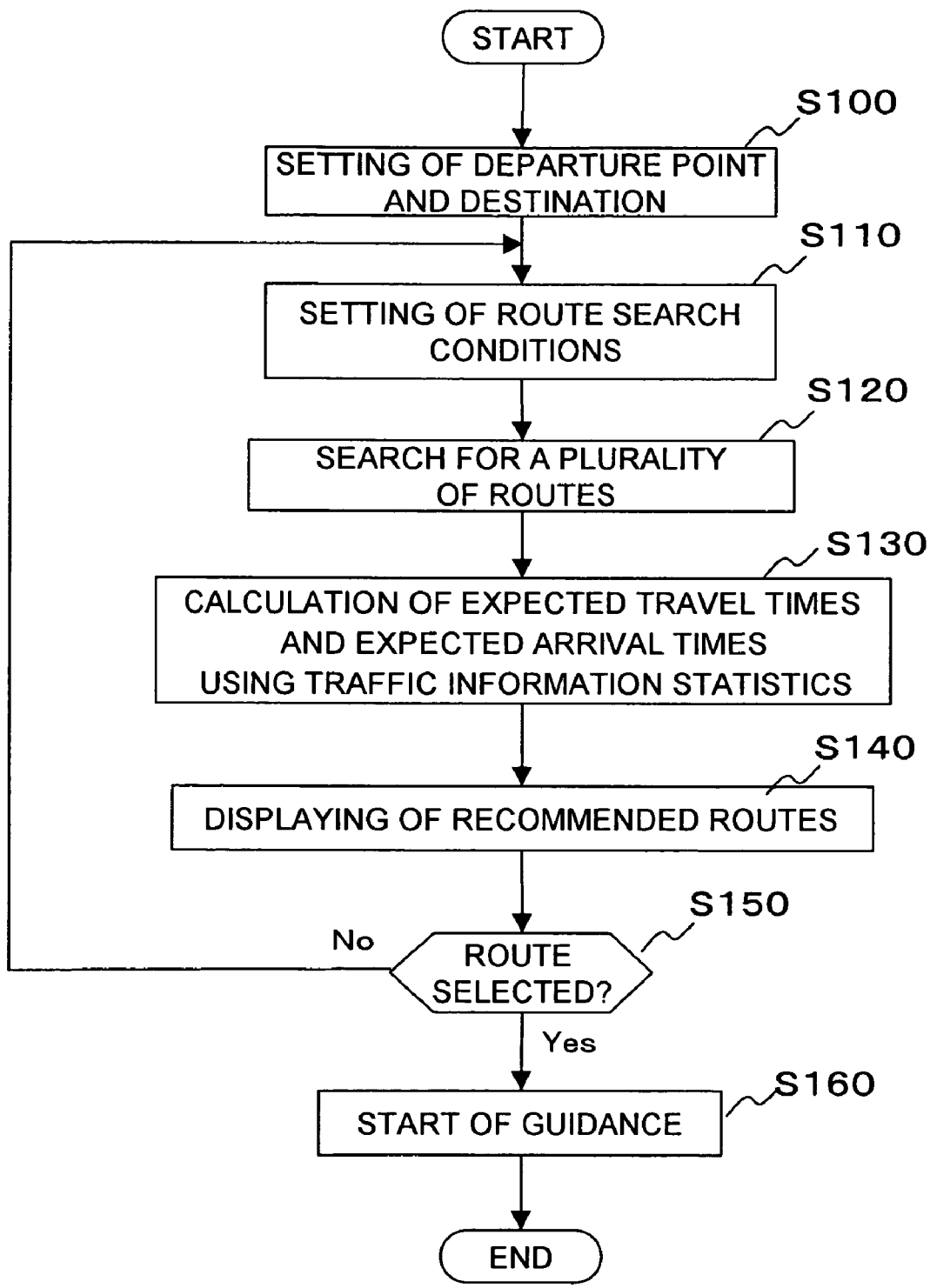
FIG. 7 is a flowchart showing an outline of operation of the car-mounted navigation device 1000.

Next, will be described operation of the car-mounted navigation device 1000. FIG. 7 is a flowchart showing an outline of operation of the car-mounted navigation device 1000 of the present embodiment.

The flow is started when the user operation analysis unit 41 receives a request for search of a recommended route from the user through the voice input/output unit 4 or the input unit 5. Then, the navigation device 1000 performs setting of a departure point and a destination (S100), setting of route search conditions (S110), searching for a plurality of routes (S120), calculation of expected travel times and expected arrival times using traffic information statistics (S130), displaying of routes (S140), receiving selection of a guided route (S150), and route guidance (S160). Each process will be described in detail in the following.

In the process of setting a departure point and a destination (S100), the user operation analysis unit 41 sets a departure point, a destination and a departure time into the route search unit 42. In detail, the present location outputted from the map matching unit 47 at the time of receiving a request for search of a recommended route is set as the departure point. Further, in the case where the present time is set as the departure time, the present time obtained by using a built-in timer (not shown) at the time of receiving the request for search of a recommended route is set as the departure time. Setting of the destination is performed based on an instruction of the user. For example, the user operation analysis unit 41 displays information on map elements on the display 2 through the menu displaying unit 50 and the graphics processing unit 51, and allows the user to select a destination from the displayed information on the map elements through the voice input/output unit 4 or the input unit 5. Here, the information on map elements has been registered in map data read from the map-statistical traffic data storage unit 3 through the data read unit 48. Or, information on locations (registered locations) that the user has previously registered in a storage unit such as the RAM 22 is displayed, and the user is allowed to select a destination from the displayed information on the registered locations through the voice input/output unit 4 or the input unit 5. Or, the user operation analysis unit 41 displays a map specified by the map data on the display 2 through the map displaying unit 45 and the graphics processing unit 51, and allows the user to select a destination by receiving designation of a point on the map from the user through the voice input/output unit 4 or the input unit 5. Here, the map data are read from the map-statistical traffic data storage unit 3 through the data read unit 48.

Next, will be described the process of setting route search conditions (S110). In the present embodiment, the car-mounted navigation device 1000 receives a plurality of search conditions from the user, and searches for a route whose cost is smallest for each search condition. Thus, in this process, the route search unit 42 sets a condition on which a route is searched for. The process of setting route search conditions (S110) may be omitted in the case where a search condition has been previously set and stored according to another flow.

Figure 8:
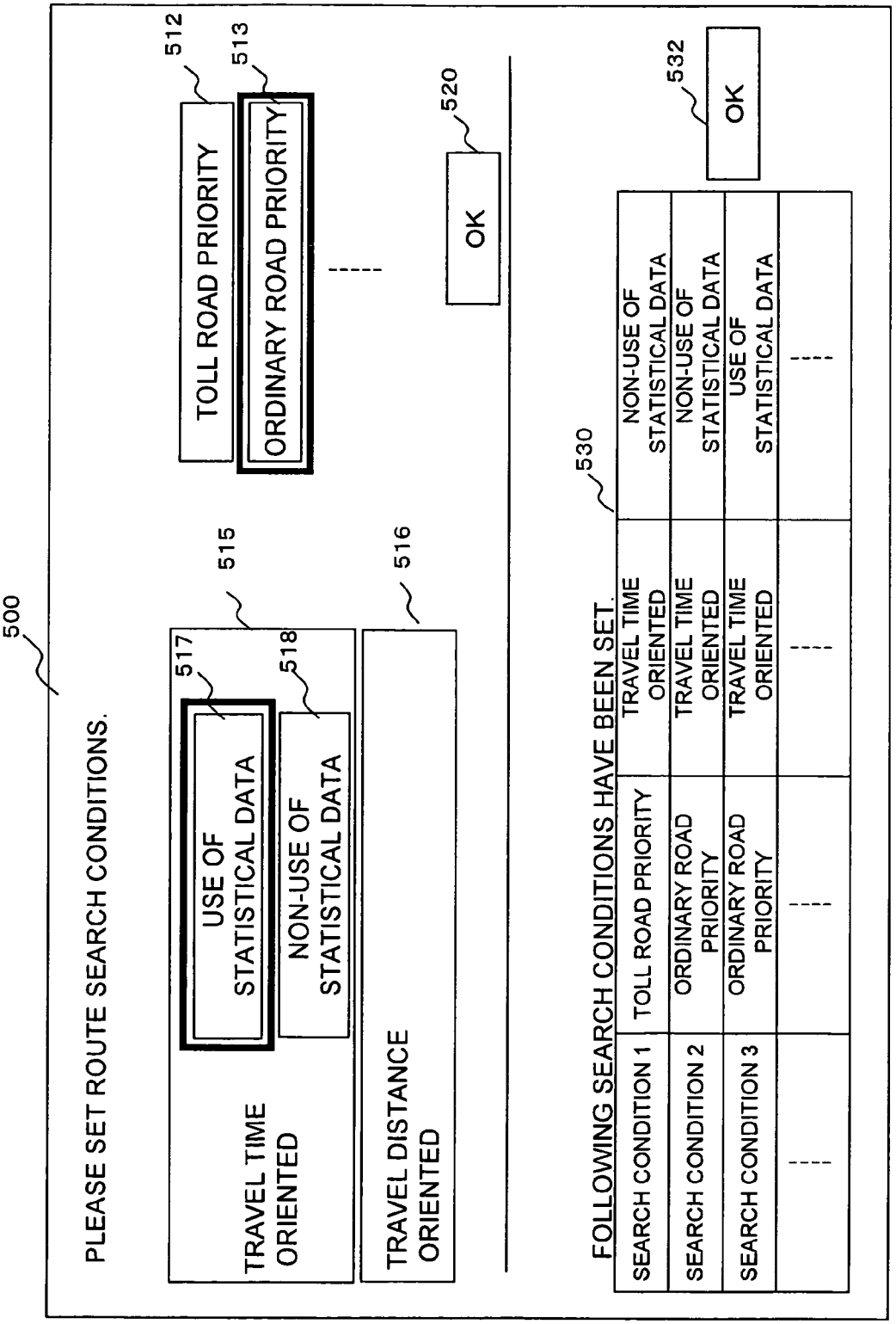
FIG. 8 is a diagram showing an example of display of a search condition setting screen.

In setting a search condition, the route search unit 42 displays a search condition setting screen 500 on the display 2 through the menu displaying unit 50 and the graphics processing unit 51, as shown in FIG. 8. The setting screen 500 lists choices 512-518 of a search condition to allow the user to set a search condition easily. The user can select a search condition through the input unit 5. As choices of a search condition, the setting screen 500 of FIG. 8 displays choices 515 and 516 for setting a search to give priority to a travel time and a travel distance respectively, and choices 512 and 513 for setting a search to give priority to specific roads such as toll roads and ordinary roads. Further, in the case where a route search is to be performed giving priority to a travel time in the present embodiment, the search is further set to use or not to use statistical traffic data. The display screen 500 shows choices 517 and 518 for setting a search to use and not to use statistical traffic data respectively. Search condition items are not limited to these, and it is possible to provide various search condition items.

When a certain search condition is selected through the input unit 5 and a virtual OK button 520 on the screen is pushed, then the user operation analysis unit 41 sends the selected search condition to the route search unit 42. The route search unit 42 establishes the search condition according to the received contents. Then, the route search unit 42 displays a list 530 of established search conditions on the screen 500 through the menu displaying unit 50 as shown in FIG. 8.

Thus, each time when the user selects a search condition, the route search unit 42 establishes the search condition, and displays a list 530 of already-established search conditions on the screen 500.

After receiving a plurality of search conditions and when the user pushes an OK button 532 through the input unit 2, then the route search unit 42 ends the process of setting route search conditions and proceeds to the next process (S120).

[Route Search Process]

When a plurality of route search conditions have been established as described above, the route search unit 42 searches for a route that satisfies each search condition (S120).

In detail, the route search unit 42 employs Dijkstra's algorithm or the like to obtain the route of the smallest cost for each search condition. Different link costs are used in a route search for different search conditions established in S110.

For example, will be described the case where a search condition giving priority to a travel time and using statistical traffic data is established.

In that case, travel times included in the traffic information statistics stored in the map-statistical traffic data storage unit 3 are used for a route search by Dijkstra's algorithm or the like.

Figure 9:
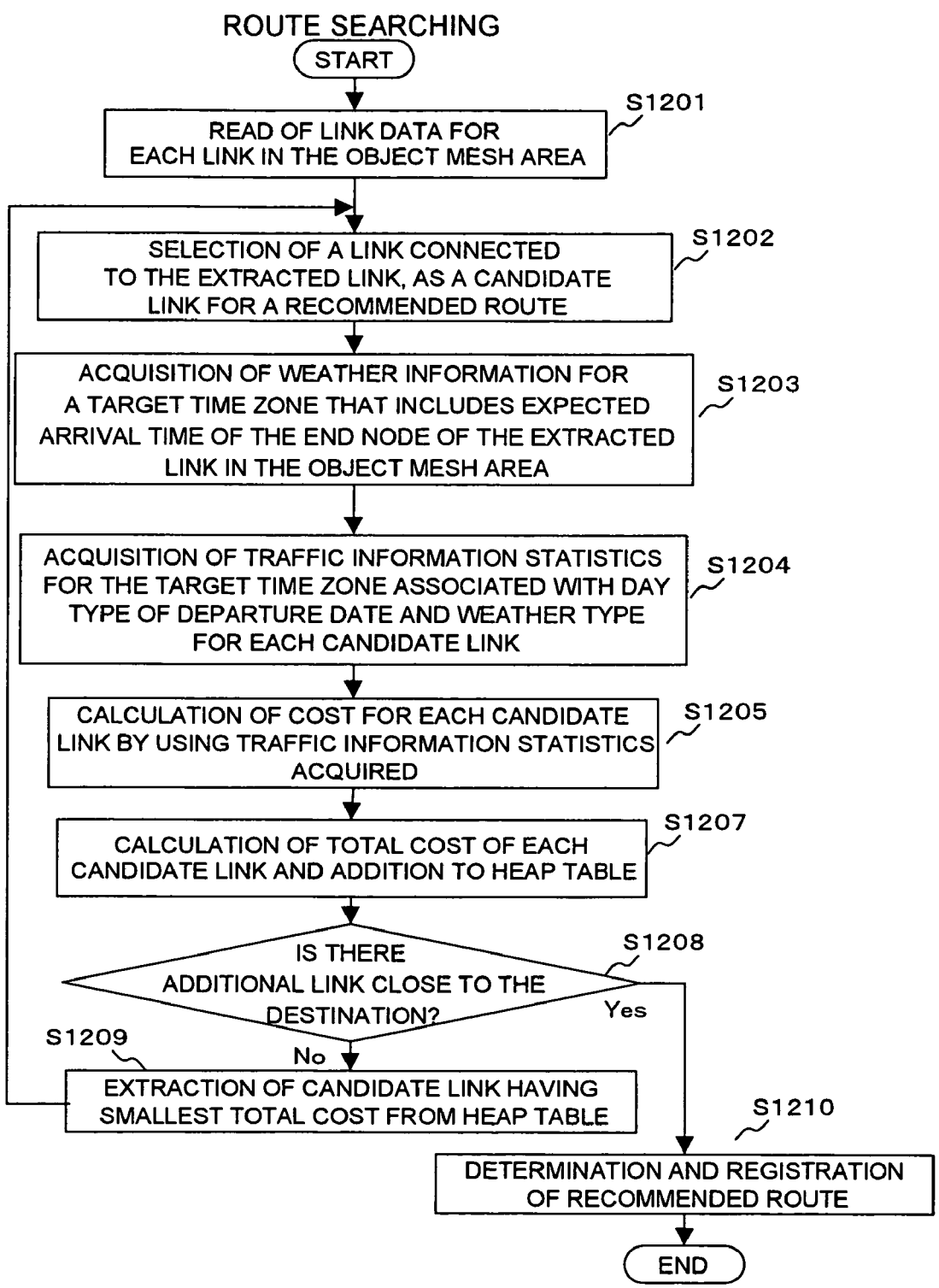
FIG. 9 is a flowchart showing a flow of a route search using traffic information statistics.

FIG. 9 is a flowchart showing a flow of a route search using the traffic information statistics. First, based on the coordinate of the present location, the route search unit 42 specifies a mesh ID of each mesh area included in an area that includes the departure point and the destination. Then, the route search unit 42 obtains each piece of link data 312 registered in each piece of map data 310 having a specified mesh ID from the map-statistical traffic data storage unit 3 through the data read unit 48. Further, the route search unit 42 reads the above-mentioned date translation table from the map-statistical traffic data storage unit 3 through the data read unit 48. Then, using the date translation table, the route search unit 42 specifies the day type of the departure date. In the case where the departure date is not registered in the date translation table, software incorporated in the car-mounted navigation device may perform the processing of specifying the day type from a date by means of computational logic in order to specify the day type corresponding to the departure date. This allows continuation of the processing even when the departure date is beyond the range of dates registered in the date translation table (S1201).

Next, using the link data 312 obtained in S1201, the route search unit 42 selects a link whose start node is the end node of the below-mentioned link extracted from a heap table in the step S1209. The selected link is a candidate for a component of a recommended route. However, in the case where the processing of S1209 has not been performed yet, i.e., in the initial stage where no link has been registered in the heap table, at least one link on which the departure point exists or at least one link close to the departure point is selected as a candidate link, instead of selecting, as a candidate link, a link whose start node is the end node of the extracted link (S1202).

Next, the route search unit 42 calculates an expected time of arrival at the end node of the extracted link. The expected arrival time can be calculated by adding the total travel time of extracted links registered in the heap table to the departure time. Further, the route search unit 42 specifies the mesh ID of the mesh area in which the end node is located, from the coordinate of the end node of the extracted link. However, in the case where the processing of S1209 has not been performed yet, i.e. in the initial stage where no link has been registered in the heap table, the route search unit 42 specifies the mesh ID of the mesh area in which the departure point is located. Then, through the FM multiplex broadcast receiver 12, the route search unit 42 obtains weather information that has the above-specified mesh ID and an object time zone (hereinafter, referred to as a target time zone) to which the expected time of arrival at the end node of the extracted link belongs (S1203). Or, weather may be judged from wiper operating state information and outside air temperature information received through the in-vehicle LAN unit 11, to use the judgment result as the weather information.

Next, through the data read unit 48, the route search unit 42 accesses the piece of statistical traffic data 320 of the mesh ID specified in S1203 among pieces of statistical traffic data 320 stored in the map-statistical traffic data storage unit 3. Then, using the management data 322 in this piece of statistical traffic data 320, the route search unit 42 obtains the following traffic information statistics for each candidate link. Namely, the route search unit 42 obtains the traffic information statistics that correspond to the target time zone and are associated with the day type specified in S1201 and the weather type specified by the weather information obtained in S1203 (S1204).

Then, using the traffic information statistics obtained in S1204, the route search unit 42 obtains a cost of each candidate link (S1205).

In the present embodiment, a search condition is defined such that it is possible to search for a route giving priority to specific roads such as toll roads or ordinary roads. Accordingly, costs of links are determined such that specific roads tend to be selected as component links of a route.

Figure 10:
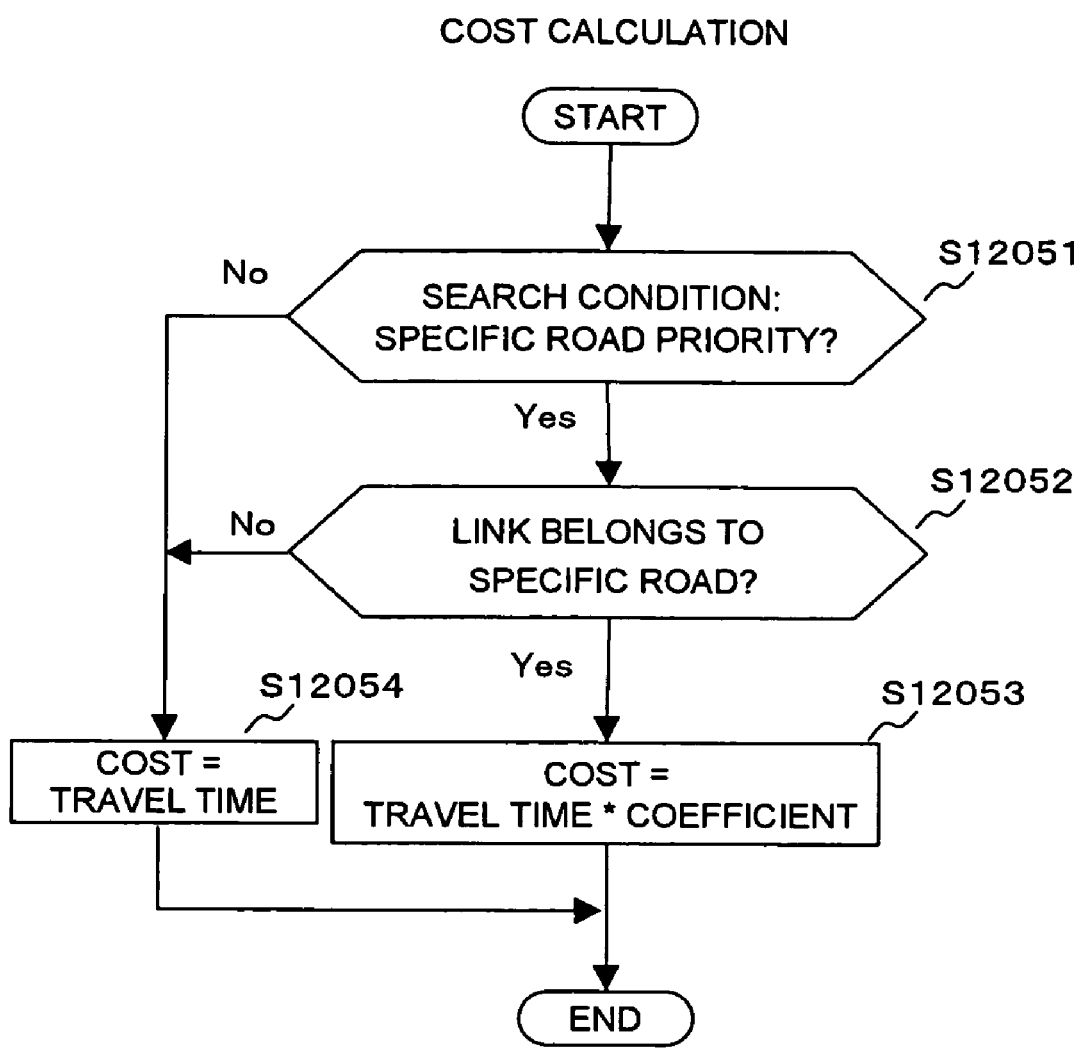
FIG. 10 is a flowchart showing a flow of determination of respective costs of links in S1205 of FIG. 9.

FIG. 10 is a flowchart showing determination of respective costs of links.

First, the route search unit 42 examines whether the search condition concerned gives priority to specific roads (S12051). In the case where the search condition does not give priority to specific roads (No in S12051), the route search unit 42 employs the travel time included in the traffic information statistics as a cost of the link in question, without processing the travel time (S12054).

On the other hand, in the case where the search condition gives priority to specific roads such as toll roads or ordinary roads (Yes in S12051), then the route search unit 42 examines whether the link in question belongs to the specific roads, referring to the link data 312 (S12052). When the link does not belong to the specific roads, the route search unit 42 employs the travel time included in the traffic information statistics as a cost of the link, without processing the travel time (S12054). When the link belongs to the specific roads (Yes in S12052), the route search unit 42 determines the link cost as a value obtained by multiplying the travel time included in the traffic information statistics by a predetermined coefficient (for example, 0.5) (S12053). Here, the predetermined coefficient is used for adjusting the priority of the specific roads. For example, as the predetermined coefficient is smaller, the cost becomes smaller. Thus, the link in question tends to be selected preferentially as a component link of a route. Thus, the value of the predetermined coefficient may be adjusted depending on the degree to which the specific roads are given priority in route searching. Further, the user may adjust the predetermined coefficient.

The description will be continued returning to FIG. 9. Now, the route search unit 42 calculates the total cost from the departure point to the end note of the candidate link. In detail, the route search unit 42 adds the cost of the candidate link, which is calculated in S1205, to the total cost of the extracted link registered in the heap table, and the result of addition is determined as the total cost of the candidate link in question. However, in the initial stage where no extracted link is registered yet in the heap table, the cost of the candidate link, which is calculated in S1205, is determined as the total cost of the candidate link in question. Then, the route search unit 42 adds the link data and the total cost of each candidate link to the heap table (S1207).

Next, the route search unit 42 examines whether the destination link exists among the links newly added to the heap table in the last step S1207 (S1208). When it is judged that the destination link does not exist (No in S1208), the route search unit 42 extracts the candidate link (un-extracted link) having the smallest total cost from the heap table, for example, by sorting the pieces of link information registered in the heap table in ascending order of their total costs, and selecting an un-extracted link positioned first (S1209). Then, the flow returns to S1202.

On the other hand, when it is judged that the destination link exists (Yes in S1208), the route search unit 42 determines a recommended route. In detail, the route search unit 42 searches the heap table for a link that has generated the destination link (i.e., the link whose end node is the start node of the destination link), and determines the retrieved link as a component link of a recommended link. Next, the route search unit 42 examines whether the component link is the departure link on which the departure point exists or that is close to the departure point. When the component link is not the destination link, the search unit 42 searches for a link that has generated this component link, and determines the retrieved link as a component and further examines whether the link is the destination link or not. Repeating this processing until it is judged that a component link is the departure link, component links constituting a recommended route are determined. Then, the route search unit 42 stores the link data 312 and the traffic information statistics obtained in S1204 for each component link constituting the recommended route into the route data storage unit 43 (S1210).

Route searching applicable to the present invention is not limited to the above-described route searching. It is possible to employ another route search method as far as the present invention can be carried out within its scope. For example, it is possible to employ a route search method in which all routes from the departure point to the destination included in anticipated mesh areas may be examined by Dijkstra's algorithm to retrieve the route having the smallest cost among those routes.

Hereinabove, the processing of a route search using statistical traffic data has been described.

On the other hand, in the case where a search condition using statistical traffic data is established, the route search unit 42 performs a route search using the travel time included in each piece of link data 312 of the map data as a link cost.

Further, in the case where a search condition giving priority to a travel distance is established, the route search unit 42 performs a route search using the link length 3124 included in each piece of link data 312 as a link const of a component link of a route.

In these cases also, when a search condition giving priority to specific roads such as toll roads is established, a value obtained by multiplying the travel time or the link length of a link belongs to the specific roads by a predetermined coefficient (for example, 0.5) is used as a cost of that link so that a link belongs to the specific roads tends to be selected.

Then, the route search unit 42 registers the retrieved route in the route data storage unit 43.

Hereinabove, the processing of searching for a route that satisfies a search condition has been described.

[Expected Travel Time Calculation Processing]

Description will be given returning to FIG. 7. When a route satisfying each of a plurality of search conditions established in S110 has been retrieved as described above, the route search unit 42 obtains an expected travel time for traveling from the departure point to the destination and an expected arrival time for each of a plurality of routes retrieved (S130).

In the present embodiment, a route search uses a travel time or a link length included in each piece of link data 312 of the map data or a travel time included in the traffic information statistics as a cost of a link, depending on a search condition determined by the user; However, in calculating an expected travel time and an expected arrival time, a travel time included in the traffic information statistics is used regardless of the search condition. Thus, the user can easily compare the search results.

Figure 11:
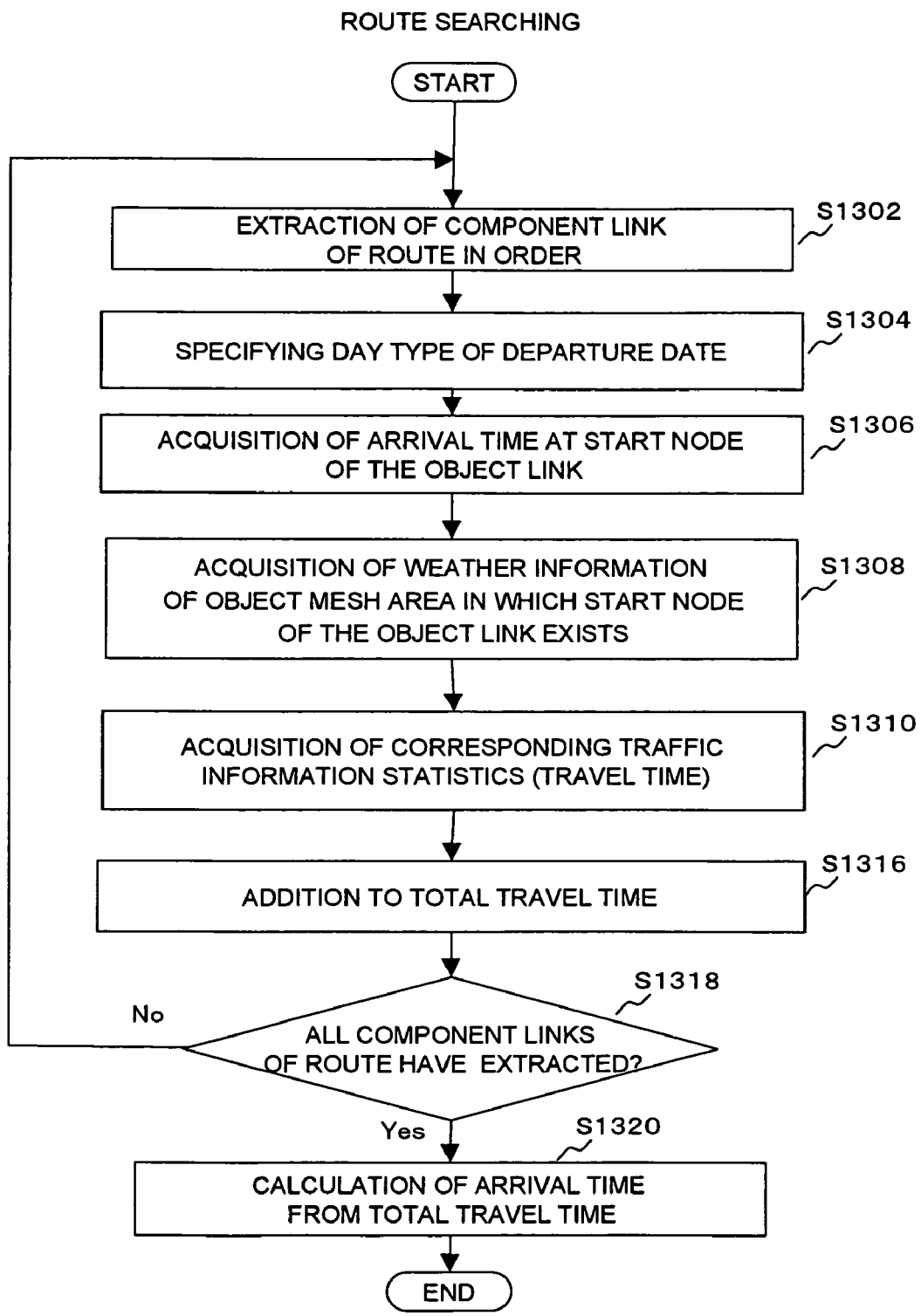
FIG. 11 is a flowchart showing a flow of obtaining an expected travel time and an expected arrival time in S130 of FIG. 7.

FIG. 11 is a flowchart showing the processing of obtaining an expected travel time.

First, the route search unit 42 extracts a component link of a route in order from the start link, for each of a plurality of routes registered in the route data storage unit 43 (S1302).

Next, the route search unit 42 specifies the day type of the departure date (S1304). In detail, the route search unit 42 read the above-mentioned date translation table from the map-statistical traffic data storage unit 3 through the data read unit 48. Then, using the date translation table, the route search unit 42 specifies the day type of the departure date. In the case where the departure date is not registered in the date translation table, software incorporated in the car-mounted navigation device may perform the processing of specifying the day type from a date by means of computational logic in order to specify the day type corresponding to the departure date. This allows continuation of the processing even when the departure date is beyond the range of dates registered in the date translation table.

Next, the route search unit 42 obtains an expected time of arrival at the start node of the link (object link) extracted in S1302 (S1306). This expected arrival time is a time obtained by adding the total travel time obtained in the below-described step S1316 to the departure time.

Next, the route search unit 42 obtains weather information on the object time zone (hereinafter, referred to as the target time zone) that includes the expected time of arrival at the start node of the object link through the FM multiplex broadcast receiver 12 (S10308). Or, weather may be judged from the wiper operating state information and the outside air temperature information received through the in-vehicle LAN unit 11, to use the judgment result as the weather information.

Next, the route search unit 42 obtains a travel time for the object link (S1310). In detail, the route search unit 42 accesses the statistical traffic data 320 stored in the map-statistical traffic data storage unit 3 through the data read unit 48. Then, using the management data 322 of the statistical traffic data 320, the route search unit 42 obtains the following traffic information statistics of the object link. Namely, the route search unit 42 obtains the traffic information statistics that correspond to the target time zone and are associated with the day type specified in S1304 and the weather type specified by the weather information obtained in S1308. Then, using the traffic information statistics obtained, the route search unit 42 obtains the cost (the travel time) of the object link.

Next, the route search unit 42 calculates the total travel time for traveling from the departure point to the end node of the object link (S1316). In detail, the route search unit 42 adds the object link's travel time obtained in S1310 to the total travel time to the start node of the object link, and determines the result of the addition as the total travel time for traveling from the departure point to the end node of the object link.

Next, the route search unit 42 judges whether the above-described processes S1302-S1316 have been performed for all the component links of the route (S1318). When the processing has not been finished for all the component links (No in S1318), the route search unit 42 returns to S1302 and extracts the next link to repeat the processing.

On the other hand, when the processing has been finished up to the last component link of the route (Yes in S1318), the route search unit 42 obtains an expected time of arrival at the destination. In detail, the route search unit 42 adds the total travel time obtained in S1316 to the departure time to obtain the expected time of arrival at the destination.

The route search unit 42 performs the above-described processes S1302-1320 for all of the plurality of routes registered in the route data storage unit 433. After obtaining the expected travel time and the expected arrival time for all the routes, the processing is moved to S140 of FIG. 7.

Next, the route search unit 42 displays the plurality of routes obtained in S120 on the display 2 through the menu displaying unit 50 and the graphics processing unit 51. At that time, the route search unit 42 displays also the search condition, the expected travel time, the expected arrival time and the total travel distance of each route.

Figure 12:
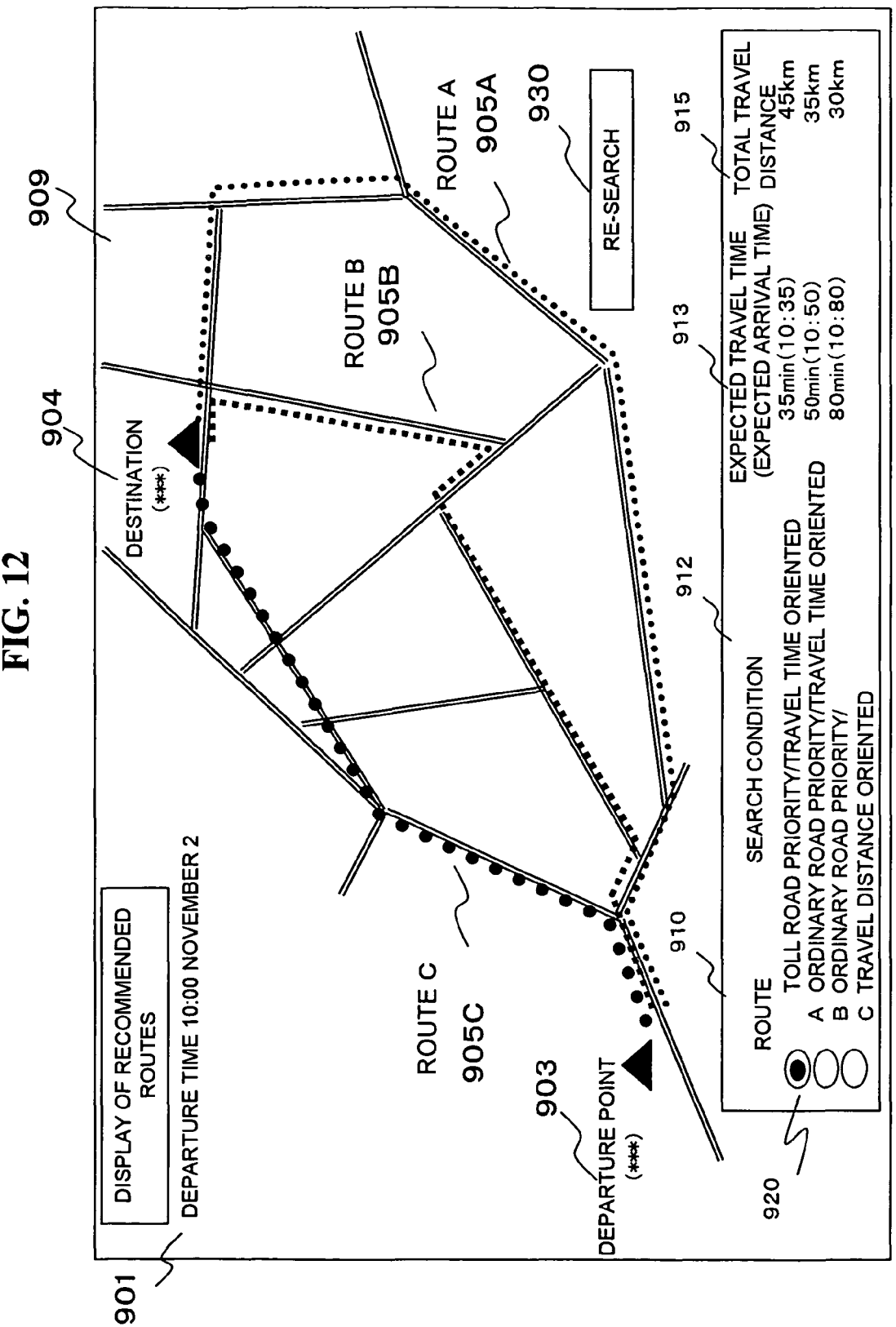
FIG. 12 is a diagram showing an example of display (map display) of a plurality of recommended routes.

FIG. 12 shows an example of a screen displayed on the display 2.

Respective recommended routes 905A-905C from the departure point 903 to the destination 904 for search conditions are shown on the map 909. Further, the search condition 912, the expected travel time (the expected arrival time) 913 and the total travel distance 915 are shown for each route 910. Owing to this display, the user can easily judge which route he should select as a guided route.

When the plurality of routes registered in the route data storage unit 43 have been displayed, then the route guidance unit 44 receives selection of the guided route (S150). At the time of receiving the selection of the guide route, the route guidance unit 44 displays route selection buttons 920 on the display screen 909 through the menu displaying unit 50, so that the user can easily select a route used for guidance through the input unit 5. Further, the display screen 909 displays a button 930 for re-searching with different search conditions.

The route guidance unit 44 judges whether route selection has been carried out (S150). When route selection is not carried, i.e. when the re-search button 930 has been pushed (No in S150), the route guidance unit 44 instructs the route search unit 42 to perform re-searching with different search conditions. Receiving this instruction, the route search unit 42 moves to the processing of S110 and establishes search conditions again to perform route searching again.

On the other hand, when a guided route is selected through the input unit 5, the user operation analysis unit 41 sends the selected route to the route guidance unit 44. Receiving the selected route, the route guidance unit 44 determines the guided route and starts guidance along the route (S160).

Here, as an expected travel time for traveling from the present location to the destination and an expected arrival time displayed in the course of the route guidance, values calculated from travel times included in the traffic information statistics are used disregarding a search condition similarly to the above.

Hereinabove, the flow of processing from the route search to the route guidance has been described.

According to the above flow, it is possible to set a plurality of search conditions and to search for a plurality of routes satisfying those search conditions. And, the retrieved routes are displayed in a form that allows easy understanding of a user.

Further, an expected travel time and an expected arrival time are calculated using travel times included in the traffic information statistics disregarding the search condition. As a result, travel times of a plurality of routes are obtained from the same information source and displayed. Thus, the user can easily compare a plurality of routes and can easily judge which route he should employ for route guidance.

Hereinabove, one embodiment to which the present invention is applied has been described.

The present invention is not limited to the above embodiment, and can be varied variously within the scope of the invention.

For example, the above embodiment uses, as a cost of a link, a travel time or a link length included in the map data or a travel time included in the traffic information statistics. However, the present invention is not limited to this. Route searching may be performed using a link travel time included in the latest traffic information (real-time traffic information) that can be obtained from a beacon or an FM multiplex broadcasting station or by accessing a traffic information distribution center that distributes traffic information through a network. In that case also, an expected travel time and an expected arrival time for a retrieved route are obtained using travel times included in the traffic information statistics stored in the map-statistical traffic data storage unit 3. Further, similarly to the above embodiment, it is possible to display expected travel times and expected arrival times obtained from the same information source for a plurality of routes that have been retrieved on different search conditions.

Further, in the case where processing is performed using traffic information statistics (for example, in the case where route searching, acquisition of an expected travel time, acquisition of an expected arrival time, or the like is performed using traffic information statistics), a warning message may be displayed when statistical traffic data are old.

For example, it is possible to store a creation date of statistical traffic data stored in the map-statistical traffic data storage unit 3. And, in the case where the creation date is before a predetermined date (for example, two years ago), a message notifying a user that statistical traffic data are old, such as "Traffic data is old", "Please obtain new statistical traffic data", or the like may be displayed on the display 2.

Further, it is possible to display a message such as "Do you use statistical traffic data?" for receiving selection of use or non-use of statistical traffic data through the input unit 5. Such processing may be performed when the statistical traffic data is judged to be old. When non-use of the statistical traffic data is selected, then the route search unit 42 may use travel times, link lengths or the like included in the map data instead of the statistical traffic data in order to perform route searching, calculation of an expected travel time, and calculation of an expected arrival time.

Further, to obtain updated statistical traffic data, it is possible to connect through a network with a server in a center that distributes the updated statistical traffic data, to download the updated data. In that case, it is possible to ask the server in the center whether the statistical traffic data are old or whether the statistical traffic data can be used for route searching and the like. Then, download of the data is performed depending on an answer. Or, the updated statistical traffic data may be downloaded according to an instruction of a user.

In the above embodiment, weather information is obtained and statistical traffic information corresponding to the obtained weather type is used for route searching employing statistical traffic information, as shown in S1204 of FIG. 9 and S1310 of FIG. 11. The present invention is not limited to this. It is possible to assume specific weather (for example, fair weather), and then statistical traffic information corresponding to that weather and the day type may be used.

Further, in the above embodiment, each piece of statistical traffic data 320 registers traffic information statistics 3224 collected for each weather type. The present invention is not limited to this. For example, statistical traffic data 320 may be collected disregarding a weather type as a collection condition.

The present invention has been described taking an example where the invention is applied to a car-mounted navigation device. However, the present invention can be applied to navigation devices other than a car-mounted navigation device.

The invention claimed is:

1. A route search method for a navigation device, wherein: said navigation device comprises a storage unit that stores link data for each link as a component of roads on a map and statistical data including link travel times obtained by statistically processing traffic information collected previously; and said method comprises:

a step of establishing a plurality of route search conditions, to derive a plurality of routes based on the plurality of route search conditions, respectively;

a route search step, in which, for each of said plurality of route search conditions, a cost of each link is determined using said link data or said statistical data depending on the route search condition in question, and a route having a smallest total cost for traveling from a departure point to a destination is searched for; and a travel time calculation step, in which an expected travel time for each of the plurality of routes retrieved in said route search step is calculated commonly using same said statistical data, to derive comparable expected travel times of the plurality of routes, respectively, which are based on commonly using same said statistical data.

2. A route search method according to claim 1 for a navigation device, wherein:

said link data includes a link travel time obtained from map information; and in said route search step, a cost of each link is determined using a link travel time included in said statistical data when a search condition is established in order to perform a search using the statistical data, and a cost of each link is determined using the link travel time included in said link data when a search condition is established in order to perform a search without using the statistical data, and then a route having a smallest total cost for traveling from the departure point to the destination is searched for.

3. A route search method according to claim 2 for a navigation device, wherein:

said link data includes link length information; and in said route search step, a cost of each link is determined using the link length information included in said link data when a search condition is established in order to perform a search giving priority to a travel distance, and then a route having a smallest total cost for traveling from the departure point to the destination is searched for.

4. A route search method for a navigation device, wherein: said navigation device comprises a storage unit that stores link data for each link as a component of roads on a map and statistical data including link travel times obtained by statistically processing traffic information collected previously; and said method comprises:

a step of establishing a plurality of route search conditions, to derive a plurality of routes based on the plurality of route search conditions, respectively;

a route search step, in which a cost of each link is determined using link length information included in said link data when a search condition is established in order to perform a search giving priority to a travel distance, and a cost of each link is determined using a link travel time included in said statistical data when a search condition is established in order to perform a search that gives priority to a travel time and uses the statistical data, and a cost of each link is determined using a link travel time obtained from map information included in said link data when a search condition is established in order to perform a search that gives priority to a travel time and does not use the statistical data, and then a route having a smallest total cost for traveling from a departure point to a destination is searched for; and a travel time calculation step, in which an expected travel time for each of the plurality of routes retrieved in said route search step is calculated commonly using same said statistical data, to derive comparable expected travel times of the plurality of routes, respectively, which are based on commonly using same said statistical data.

5. A route search method according to claim 4 for a navigation device, wherein:

said link data for each link includes road type information of the link in question; and in said route search step, when a search condition is established in order to perform a route search giving priority to a specific road type, a cost of a link of said specific road type is determined lower in comparison with links of other road types, based on said road type information.

6. A route search method according to claim 5 for a navigation device, wherein:

said navigation device displays the expected travel times calculated in said travel time calculation step.

7. A route search method for a navigation device, wherein: said navigation device comprises a storage unit that stores link data for each link as a component of roads on a map and statistical data including link travel times obtained by statistically processing traffic information collected previously;

said method comprises:

a step of establishing a plurality of route search conditions, to derive a plurality of routes based on the plurality of route search conditions, respectively;

a route search step, in which a cost of each link is determined using said link data or said statistical data depending on a search condition, and a route having a smallest total cost for traveling from a departure point to a destination is searched for; and a route guidance step, in which route guidance is performed using the route retrieved in said route search step; and an expected travel time used for said route guidance is calculated commonly using same said statistical data, to derive comparable expected travel times of the plurality of routes, respectively, which are based on commonly using same said statistical data.

8. A route search method for a navigation device, wherein: said navigation device comprises a storage unit that stores link travel times used for calculating an expected travel time for traveling from a departure point to a destination; and said method comprises:

a step of establishing a plurality of route search conditions, to derive a plurality of routes based on the plurality of route search conditions, respectively;

a route search step, in which, for each of said plurality of route search conditions, a cost of each link is determined depending on the route search condition in question, and a route having a smallest total cost is searched for; and a travel time calculation step, in which an expected travel time for each of the plurality of routes retrieved in said route search step is calculated commonly using same said link travel times stored in said storage unit, disregarding said route search condition, to derive comparable expected travel times of the plurality of routes, respectively, which are based on commonly using same said link travel times.

9. A route search method according to claim 7 for a navigation device, wherein:
said navigation device performs a receiving step in which selection of use or non-use of the statistical data is received; and
when a route search without using the statistical data is selected in said receiving step, then, in said route search step, a route search is performed without using the statistical data, and calculation of said expected travel time is performed using said link data and without using the statistical data.

10. A navigation device comprising:
a storage unit that stores link data for each link as a component of roads on a map and statistical data including link travel times obtained by statistically processing traffic information collected previously;
a search condition establishing unit that establishes a plurality of route search conditions, to derive a plurality of routes based on the plurality of route search conditions, respectively;
a route search unit that determines, for each of said plurality of route search conditions, a cost of each link using said link data or said statistical data depending on the route search condition in question, and searches for a route having a smallest total cost for traveling from a departure point to a destination; and
a travel time calculation unit that calculates an expected travel time commonly using same said statistical data, for each of the plurality of routes retrieved by said route search unit, to derive comparable expected travel times of the plurality of routes, respectively, which are based on commonly using same said statistical data.

11. A navigation device comprising:
a storage unit that stores link data for each link as a component of roads on a map and statistical data including link travel times obtained by statistically processing traffic information collected previously;
a search condition establishing unit that establishes a plurality of route search conditions, to derive a plurality of routes based on the plurality of route search conditions, respectively;
a route search unit that:
determines a cost of each link using link length information included in said link data when a search condition is established in order to perform a search giving priority to a travel distance;
determines a cost of each link using a link travel time included in said statistical data when a search condition is established in order to perform a search that gives priority to a travel time and uses the statistical data;
determines a cost of each link using a link travel time obtained from map information included in said link data when a search condition is established in order to perform a search that gives priority to a travel time and does not use the statistical data; and
searches for a route having a smallest total cost for traveling from a departure point to a destination; and
a travel time calculation unit that calculates an expected travel time commonly using same said statistical data for each of the plurality of routes retrieved by said route search unit, to derive comparable expected travel times of the plurality of routes, respectively, which are based on commonly using same said statistical data.

12. A navigation device, wherein:
said navigation device comprises:
a storage unit that stores link data for each link as a component of roads on a map and statistical data including link travel times obtained by statistically processing traffic information collected previously;
a search condition establishing unit that establishes a plurality of route search conditions, to derive a plurality of routes based on the plurality of route search conditions, respectively;
a route search unit that determines a cost of each link using said link data or said statistical data depending on a search condition and searches for a route having a smallest total cost for traveling from a departure point to a destination; and
a route guidance unit that performs route guidance using the route retrieved by said route search unit; and
an expected travel time used for said route guidance is calculated commonly using same said statistical data, to derive comparable expected travel times of the plurality of routes, respectively, which are based on commonly using same said statistical data.

13. A navigation device comprising:
a storage unit that stores link travel times used for calculation of an expected travel time for traveling from a departure point to a destination;
a search condition establishing unit that establishes a plurality of route search conditions, to derive a plurality of routes based on the plurality of route search conditions, respectively;
a route search unit that determines, for each of said plurality of route search conditions, a cost of each link depending on the route search condition in question, and searches for a route having a smallest total cost; and
a travel time calculation unit that calculates an expected travel time commonly using same said link travel times stored in said storage unit disregarding said route search condition, for each of the plurality of routes retrieved by said route search unit, to derive comparable expected travel times of the plurality of routes, respectively, which are based on commonly using same said link travel times.

14. A navigation device according to claim 10, wherein:
said link data includes a link travel time obtained from map information; and
in said route search unit, a cost of each link is determined using a link travel time included in said statistical data when a search condition is established in order to perform a search using the statistical data, and a cost of each link is determined using the link travel time included in said link data when a search condition is established in order to perform a search without using the statistical data, and then a route having a smallest total cost for traveling from the departure point to the destination is searched for.

15. A navigation device according to claim 14, wherein:
said link data includes link length information; and
in said route search unit, a cost of each link is determined using the link length information included in said link data when a search condition is established in order to perform a search giving priority to a travel distance, and then a route having a smallest total cost for traveling from the departure point to the destination is searched for.

16. A navigation device according to claim 11, wherein:
said link data for each link includes road type information of the link in question; and
in said route search unit, when a search condition is established in order to perform a route search giving priority to a specific road type, a cost of a link of said specific road type is determined lower in comparison with links of other road types, based on said road type information.

17. A navigation device according to claim 16, wherein:
said navigation device displays the expected travel times calculated in said travel time calculation unit.

18. A navigation device according to claim 12, comprising:
a receiving unit receiving selection of use or non-use of the statistical data; and
when a route search without using the statistical data is selected in said receiving unit, then, in said route search unit, a route search is performed without using the statistical data, and calculation of said expected travel time is performed using said link data and without using the statistical data.

19. A route search method according to claim 1 for a navigation device, comprising:
a display comparison step, in which the plurality of routes and the expected travel times of the plurality of routes are outputted to a user for user review.

20. A navigation device according to claim 1, comprising:
a display comparison unit, in which the plurality of routes and the expected travel times of the plurality of routes are outputted to a user for user review.

* * * * *